United States Patent
Conage et al.

(10) Patent No.: US 11,989,575 B2
(45) Date of Patent: May 21, 2024

(54) BI-DIRECTIONAL INTERPOSITIONING OF VIRTUAL HARDWARE

(71) Applicant: Raytheon Company, Waltham, MA (US)

(72) Inventors: Adrianne Conage, Baltimore, MD (US); Yasmine A. Zakout, Alexandria, VA (US)

(73) Assignee: NIGHTWING GROUP, LLC., New York, NY (US)

( * ) Notice: Subject to any disclaimer, the term of this patent is extended or adjusted under 35 U.S.C. 154(b) by 456 days.

(21) Appl. No.: 16/893,904

(22) Filed: Jun. 5, 2020

(65) Prior Publication Data

US 2021/0382742 A1    Dec. 9, 2021

(51) Int. Cl.
*G06F 9/455* (2018.01)
*G06F 9/54* (2006.01)
*G06F 13/42* (2006.01)

(52) U.S. Cl.
CPC .......... *G06F 9/45558* (2013.01); *G06F 9/546* (2013.01); *G06F 13/4221* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS 9,264,400 B1 * 2/2016 Lin .................... H04L 49/30
10,263,832 B1   4/2019 Ghosh
10,848,461 B2 * 11/2020 Hira .................. H04L 41/0894
11,070,521 B2 *  7/2021 Zhao ................. H04L 63/0263
11,405,335 B2 *  8/2022 Jain .................. H04L 49/30
2015/0071292 A1 *  3/2015 Tripathi ............. H04L 47/35
                                                    370/392

(Continued)

OTHER PUBLICATIONS

Search Report and Written Opinion dated Aug. 9, 2021 for PCT Application No. PCT/US2021/027625; 12 pages.

(Continued)

*Primary Examiner* — Lewis A Bullock, Jr.
*Assistant Examiner* — Melissa A Headly
(74) *Attorney, Agent, or Firm* — Cowan, Liebowitz & Latman, P.C.

(57) ABSTRACT

A method is provided comprising: retrieving a message that is designated for transmission via a first one of a plurality of communications hardware devices, the message being retrieved from a virtual device queue that is associated with the first communications hardware device, the message being generated by a first virtual machine, and the message being designated for transmission to a second virtual machine; selecting a second one of the plurality of communications hardware devices based on a characteristic of the message; and storing the message in a socket queue that is associated with the second communications hardware device, wherein storing the message in the socket queue that is associated with the second communications hardware device causes the message to be transmitted to the second virtual machine via the second communications hardware device rather than the first communications hardware device.

17 Claims, 7 Drawing Sheets

(56) References Cited

U.S. PATENT DOCUMENTS

| | | | | |
|---|---|---|---|---|
| 2015/0347175 A1* | 12/2015 | DeCusatis | ........... | G06F 9/45558 |
| | | | | 718/1 |
| 2019/0109789 A1* | 4/2019 | Friedman | ................ | H04L 47/31 |
| 2020/0249874 A1* | 8/2020 | Foo | ....................... | G06F 3/0631 |

OTHER PUBLICATIONS

International Preliminary Report on Patentability dated Dec. 15, 2022 for PCT Application No. PCT/US2021/027625, 7 pages.

* cited by examiner

FIG. 1

(PRIOR ART)

| CONDITION | | DEVICE IDENTIFIER | | |
|---|---|---|---|---|
| SRC = VM 341 && DST = VM 342 | 402 | SOCKET QUEUE 323 | 404 | ⌒410A |
| SRC = VM 341 && DST = VM 343 | 402 | SOCKET QUEUE 324 | 404 | ⌒410B |
| SRC = VM 341 && DST = VM 344 | 402 | SOCKET QUEUE 325 | 404 | ⌒410C |
| SRC = VM 342 && DST = VM 341 | 402 | SOCKET QUEUE 323 | 404 | ⌒410D |
| SRC = VM 342 && DST = VM 343 | 402 | SOCKET QUEUE 324 | 404 | ⌒410E |
| SRC = VM 342 && DST = VM 344 | 402 | SOCKET QUEUE 325 | 404 | ⌒410F |
| SRC = VM 343 && DST = VM 341 | 402 | SOCKET QUEUE 323 | 404 | ⌒410G |
| SRC = VM 343 && DST = VM 342 | 402 | SOCKET QUEUE 324 | 404 | ⌒410H |
| SRC = VM 343 && DST = VM 344 | 402 | SOCKET QUEUE 325 | 404 | ⌒410I |
| SRC = VM 344 && DST = VM 341 | 402 | SOCKET QUEUE 323 | 404 | ⌒410J |
| SRC = VM 344 && DST = VM 342 | 402 | SOCKET QUEUE 324 | 404 | ⌒410K |
| SRC = VM 344 && DST = VM 343 | 402 | SOCKET QUEUE 325 | 404 | ⌒410L |

| CONDITION | | HARDWARE DEVICE IDENTIFIER | | |
|---|---|---|---|---|
| CONDITION SET #1 | 422A | HARDWARE DEVICE 313 | 424A | ⌒420A |
| CONDTION SET #2 | 422B | HARDWARE DEVICE 314 | 424B | ⌒420B |
| CONDITION SET #3 | 422C | HARDWARE DEVICE 315 | 424C | ⌒420C |

BI-DIRECTIONAL INTERPOSITIONING OF VIRTUAL HARDWARE

BACKGROUND

Virtualization is a method for logically dividing system resources provided by a computer between different operating systems and/or different applications. Virtualization permits efficient sharing of computing resources, and it is widely used in distributed computing and productivity-oriented applications.

SUMMARY

According to aspects of the disclosure, a method is provided comprising: retrieving a message that is designated for transmission via a first one of a plurality of communications hardware devices, the message being retrieved from a virtual device queue that is associated with the first communications hardware device, the message being generated by a first virtual machine, and the message being designated for transmission to a second virtual machine; selecting a second one of the plurality of communications hardware devices based on a characteristic of the message; and storing the message in a socket queue that is associated with the second communications hardware device, wherein storing the message in the socket queue that is associated with the second communications hardware device causes the message to be transmitted to the second virtual machine via the second communications hardware device rather than the first communications hardware device.

According to aspects of the disclosure, a system is provided comprising: a memory; and at least one processor operatively coupled to the memory, the at least one processor being configured to perform the operations of: retrieving a message that is designated for transmission via a first one of a plurality of communications hardware devices, the message being retrieved from a virtual device queue that is associated with the first communications hardware device, the message being generated by a first virtual machine, and the message being designated for transmission to a second virtual machine; selecting a second one of the plurality of communications hardware devices based on a characteristic of the message; and storing the message in a socket queue that is associated with the second communications hardware device, wherein storing the message in the socket queue that is associated with the second communications hardware device causes the message to be transmitted to the second virtual machine via the second communications hardware device rather than the first communications hardware device.

According to aspects of the disclosure, a non-transitory computer-readable medium storing one or more processor-executable instructions, which when executed by at least one processor to perform the operations of: retrieving a message that is designated for transmission via a first one of a plurality of communications hardware devices, the message being retrieved from a virtual device queue that is associated with the first communications hardware device, the message being generated by a first virtual machine, and the message being designated for transmission to a second virtual machine; selecting a second one of the plurality of communications hardware devices based on a characteristic of the message; and storing the message in a socket queue that is associated with the second communications hardware device, wherein storing the message in the socket queue that is associated with the second communications hardware device causes the message to be transmitted to the second virtual machine via the second communications hardware device rather than the first communications hardware device.

BRIEF DESCRIPTION OF THE DRAWINGS

The foregoing features may be more fully understood from the following description of the drawings in which.

DETAILED DESCRIPTION

Figure 1:
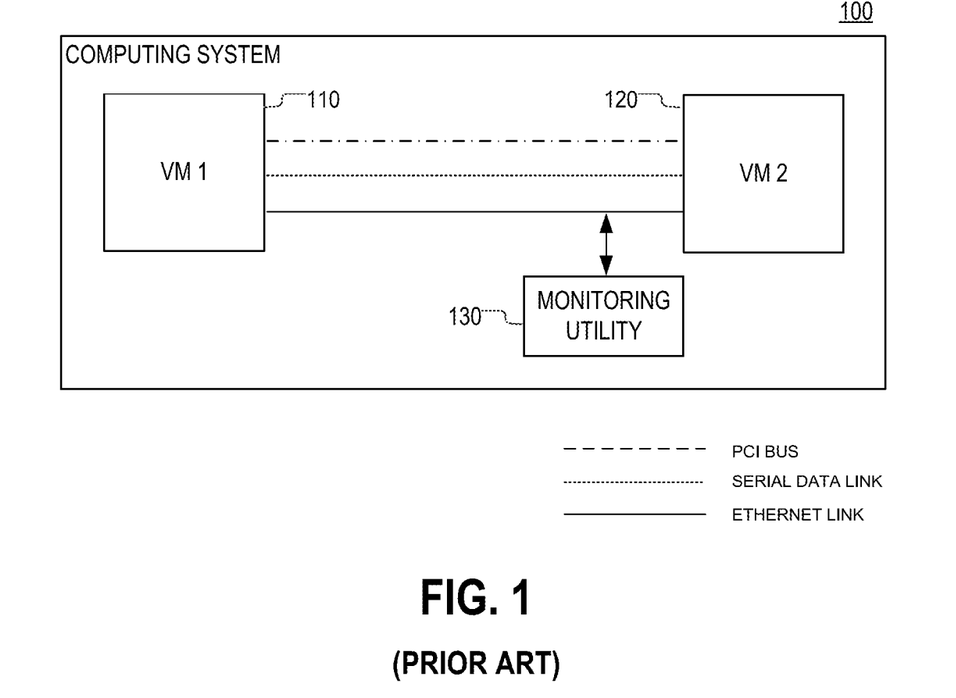
FIG. 1 is a diagram of an example of a computing system, according to the prior art.

FIG. 1 is a diagram of a computing system 100, according to the prior art. The computing system 100 is configured to execute a virtual machine 110 and a virtual machine 120. The virtual machines 110 and 120 are coupled to one another via three communications channels, as shown. The communications channels include a PCI bus, a serial data link, and an Ethernet link. According to the example of FIG. 1, the computing system 100 is configured to execute a monitoring utility for monitoring traffic that is transmitted over the Ethernet link. The monitoring utility 130 may be used to detect various security threats or flaws in the virtual machine 120. The monitoring utility 130 can be circumvented by the virtual machine 110 (and/or malicious software running on the virtual machine 110) by transmitting data over other available communications channels, such as the serial data link or the PCI bus. As can be readily appreciated, the possibility of bypassing the monitoring utility 130 represents a security vulnerability, and its existence is undesirable.

Figure 2:
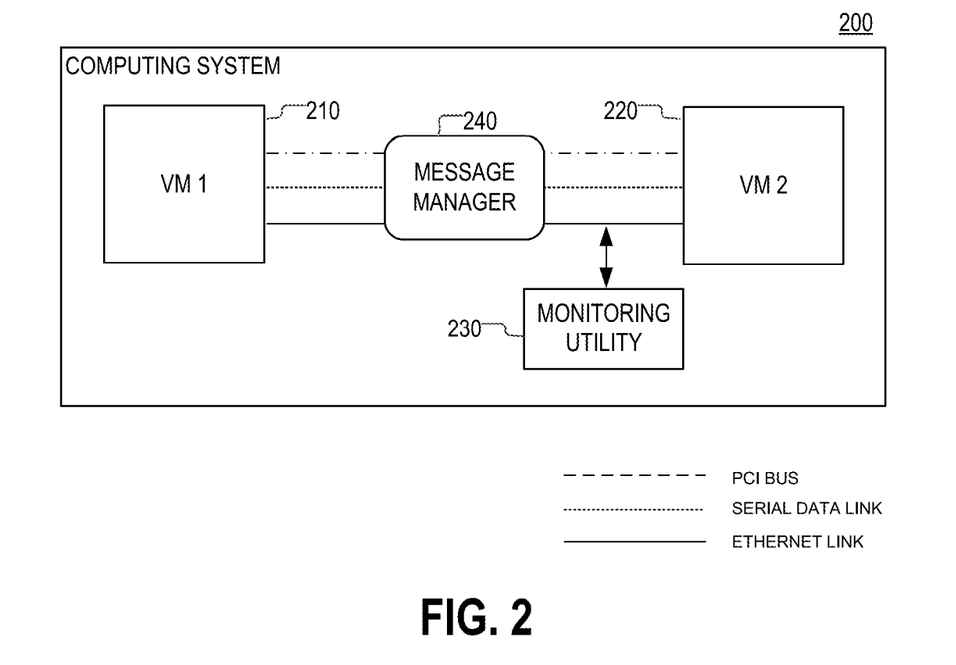
FIG. 2 is a diagram of an example of a system, according to aspects of the disclosure.

FIG. 2 is a diagram of an example of a computing system 200, according to aspects of the disclosure. The computing system 200 may be configured to execute a virtual machine 210 and a virtual machine 220. The virtual machines 210 and 220 may be coupled to one another via three communications channels, as shown. The communications channels may include a PCI bus, a serial data link, and an Ethernet link. The computing system 200 may be configured to execute a monitoring utility 230 for monitoring traffic that is transmitted over the Ethernet link. The monitoring utility 230 may be used to detect various security threats or flaws in the virtual machine 220. The computing system 200 may also be configured to execute a message manager 240. In one implementation, the message manager 240 may be arranged to intercept messages transmitted by the virtual machine 210 to the virtual machine 220 and force those messages on the Ethernet link. In some respects, executing the message manager 240 on the computing system 200 is advantageous because it may prevent the monitoring utility 230 from being circumvented via other available channels, such as the PCI bus or the serial data link. In other words, executing the message manager on the computing system 200 may help close security vulnerabilities, such as the one described above with respect to FIG. 1, thereby increasing the overall security of the computing system 200.

Figure 3:
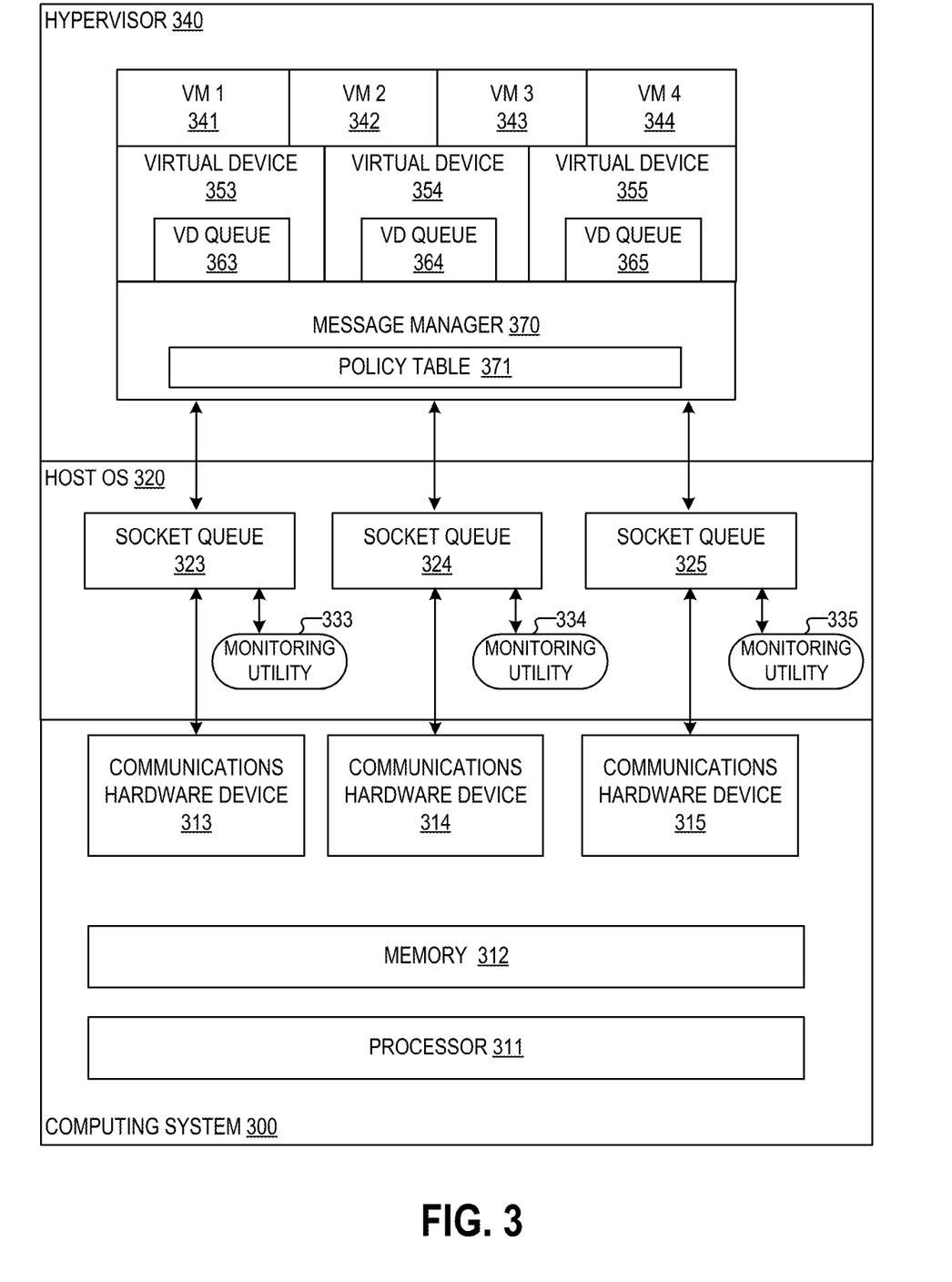
FIG. 3 is a diagram of an example of a system, according to aspects of the disclosure.

FIG. 3 is a diagram of an example of the computing system 300, according to aspects of the disclosure. The computing system 300 may include any suitable type of distributed and/or integrated computing system. In some implementations, the computing system 300 may be the same or similar to the computing system 200, which is discussed above with respect to FIG. 2.

According to one example, the computing system 300 may include a processor 311, a memory 312, a communications hardware device 313, a communications hardware device 314, and a communications hardware device 315. The processor 311 may include one or more of a general-purpose processor (e.g., an x86 processor or a RISC processor), a Field Programmable Gate Array (FPGA), an Application-Specific Integrated Circuit (ASIC), and/or any other suitable type of processing circuitry. The memory 312 may include any suitable type of volatile or non-volatile memory. In some implementations, the memory 312 may include a solid-state drive (SSD), a hard-disk (HD), a random-access memory (RAM), a non-volatile random-access memory (nvRAM), a Synchronous Dynamic Random-Access Memory (SDRAM), an Electrically Erasable Electrically Programmable Read-Only Memory (EEPROM), and/or any other suitable type of memory. The communications hardware device 313 may include hardware for transmitting data over a first communications channel (e.g., a PCI bus controller). The communications hardware device 314 may include hardware for transmitting data over a second communications channel (e.g., a serial data link controller). And the communications hardware device 315 may include hardware for transmitting data over a third communications channel (e.g., an Ethernet controller). According to the example of FIG. 3, the first communications channel is a PCI bus, the second communications channel is a serial data link, and the third communications channel is an Ethernet link. However, it will be understood that the present disclosure is not limited to any specific type of communications channel. As used throughout the disclosure, the term communications channel may refer to "a data bus", "a network connection", and/or "a data connection", for example.

The computing system 300 may be configured to execute a host operating system 320. The host operating system may include a Windows™ operating system, a Linux distribution, and/or any other suitable type of operating system that supports virtualization. As illustrated, the host operating system 320 may include a socket queue 323, a socket queue 324, and a socket queue 325. Furthermore, the host operating system 320 may be configured to execute a monitoring utility 333, a monitoring utility 334, and a monitoring utility 335.

The socket queue 323 may be associated with the communications hardware device 313. The socket queue 323 may be associated with a socket that has been allocated to the communications hardware device 313 by the host operating system 320. In some implementations, any messages that are desired to be transmitted over the first communications channel (e.g., a PCI bus) may be placed in the socket queue 323. Afterwards, the messages may be retrieved from the socket queue 323 by a driver of the communications hardware device 313 (e.g., a PCI bus driver) and transmitted by using the communications hardware device 313 (e.g., a PCI bus controller) in a well-known fashion.

The socket queue 324 may be associated with the communications hardware device 314. The socket queue 324 may be associated with a socket that has been allocated to the communications hardware device 314 by the host operating system 320. In some implementations, any messages that are desired to be transmitted over the second communications channel (e.g., a serial data link) may be placed in the socket queue 324. Afterwards, the messages may be retrieved from the socket queue 324 by a driver of the communications hardware device 314 (e.g., a serial data link driver) and transmitted by using the communications hardware device 314 (e.g., a serial data link controller) in a well-known fashion.

The socket queue 325 may be associated with the communications hardware device 315. The socket queue 325 may be associated with a socket that has been allocated to the communications hardware device 315 by the host operating system 320. In some implementations, any messages that are desired to be transmitted over the third communications channel (e.g., a serial data link) may be placed in the socket queue 325. Afterwards, the messages may be retrieved from the socket queue 325 by a driver of the communications hardware device 315 (e.g., a serial data link driver) and transmitted by using the communications hardware device 315 (e.g., an Ethernet controller) in a well-known fashion.

The monitoring utility 333 may include any suitable type of monitoring utility, such as Metasploit™ and Wireshark™, for example. The monitoring utility 333 may be arranged to monitor traffic that is transmitted over the first communications channel (e.g., a PCI bus) and detect abnormalities in the traffic. More particularly, the monitoring utility 333 may be arranged to examine messages that are stored in the socket queue 323 and detect flaws (or bugs) in the computing system 300. By way of example, such flaws may include flaws in communications protocols that are used by the computing system 300 (or any of its components), flaws in any of the virtual machines 341-344, flaws in any of the virtual devices that are provided by the hypervisor 340, and/or any other suitable type of flaw. When any such flaw is detected, the monitoring utility 333 may generate an alert.

The monitoring utility 334 may include any suitable type of monitoring utility, such as Metasploit™ and Wireshark™, for example. The monitoring utility 334 may be arranged to monitor traffic that is transmitted over the second communications channel (e.g., a serial data link) and detect abnormalities in the traffic. More particularly, the monitoring utility 334 may be arranged to examine messages that are stored in the socket queue 324 and detect flaws (or bugs) in the computing system 300. By way of example, such flaws may include flaws in communications protocols that are used by the computing system 300 (or any of its components), flaws in any of the virtual machines 341-344, flaws in any of the virtual devices that are provided by the hypervisor 340, and/or any other suitable type of flaw. When any such flaw is detected, the monitoring utility 334 may generate an alert.

The monitoring utility 335 may include any suitable type of monitoring utility, such as Metasploit™ and Wireshark™, for example. The monitoring utility 335 may be arranged to monitor traffic that is transmitted over the third communications channel (e.g., an Ethernet link) and detect abnormalities in the traffic. More particularly, the monitoring utility 335 may be arranged to examine messages that are stored in the socket queue 325 and detect flaws (or bugs) in the computing system 300. By way of example, such flaws may include flaws in communications protocols that are used by the computing system 300 (or any of its components), flaws in any of the virtual machines 341-344, flaws in any of the virtual devices that are provided by the hypervisor 340, and/or any other suitable type of flaw. When any such flaw is detected, the monitoring utility 335 may generate an alert.

The host operating system 320 may be configured to execute a hypervisor 340. The hypervisor 340 may include a KI2 hypervisor, a XEN hypervisor, and/or any other suitable type of hypervisor. The hypervisor 340 may be configured to execute a virtual machine 341, a virtual machine 342, a virtual machine 343, and a virtual machine 344. Furthermore, the hypervisor 340 may provide a virtual device 353, a virtual device 354, and a virtual device 355.

The virtual device 353 may be associated with the communications hardware device 313, and as such, it may be arranged to provide (to the virtual machines 341-344) an interface for transmitting messages via the communications hardware device 313 (and/or the first communications channel). In other words, the virtual device 353 may be an abstraction of the communications hardware device 313 that is maintained within the hypervisor 340 for use by the hypervisor's 340 constituent virtual machines. As illustrated, the virtual device 353 may include (or otherwise be associated with) a virtual device queue 363. When any of the virtual machines 341-344 wants to transmit a message via the communications hardware device 313 (and/or the first communications channel), the virtual machine may write the message to the virtual device queue 363, with the expectation that the message would be copied from the virtual device queue 363 to the socket queue 323, which in turn would result in the message being transmitted by the communications hardware device 313 (via the first communications channel).

The virtual device 354 may be associated with the communications hardware device 314, and as such, it may be arranged to provide (to the virtual machines 341-344) an interface for transmitting messages via the communications hardware device 314 (and/or the second communications channel). In other words, the virtual device 354 may be an abstraction of the communications hardware device 314 that is maintained within the hypervisor 340 for use by the hypervisor's 340 constituent virtual machines. As illustrated, the virtual device 354 may include (or otherwise be associated with) a virtual device queue 364. When any of the virtual machines 341-344 wants to transmit a message via the communications hardware device 314 (and/or the second communications channel), the virtual machine may write the message to the virtual device queue 364, with the expectation that the message would be copied from the virtual device queue 364 to the socket queue 324, which in turn would result in the message being transmitted by the communications hardware device 314 (via the second communications channel).

The virtual device 355 may be associated with the communications hardware device 315, and as such, it may be arranged to provide (to the virtual machines 341-344) an interface for transmitting messages via the communications hardware device 315 (and/or the first communications channel). In other words, the virtual device 355 may be an abstraction of the communications hardware device 315 that is maintained within the hypervisor 340 for use by the hypervisor's 340 constituent virtual machines. As illustrated, the virtual device 355 may include (or otherwise be associated with) a virtual device queue 365. When any of the virtual machines 341-344 wants to transmit a message via the communications hardware device 315 (and/or the first communications channel), the virtual machine may write the message to the virtual device queue 365, with the expectation that the message would be copied (by the hypervisor 340) from the virtual device queue 365 to the socket queue 325, which in turn would result in the message being transmitted by the communications hardware device 315 (via the third communications channel).

The hypervisor 340 may be configured to execute a message manager 370. The message manager 370 may be arranged to dynamically route messages from the virtual device queues 363-365 to the socket queues 323-325. For example, the message manager 370 may retrieve a message from the queue of the virtual device 353 (which is associated with the communications hardware device 313) and store the message in the socket queue 324 (which is associated with the communications hardware device 314), even though the virtual device 353 does not represent the communications hardware device 314. As another example, the message manager 370 may retrieve a message from the queue of the virtual device 354 (which is associated with the communications hardware device 314) and store the message in the socket queue 325 (which is associated with the communications hardware device 315), even though the virtual device 355 does not represent the communications hardware device 314. In other words, the message manager 370 may retrieve a message from any virtual device queues 363-365 and store the message in any of the socket queues 323-325, irrespective of which one of the virtual device queues the message is retrieved from.

Conventional computing systems may enforce a strict one-to-one mapping between virtual device queues and socket queues. In such systems, any message that is stored in a given virtual device queue may be copied only to the socket queue corresponding to the hardware device, which the given virtual device represents. In such computing systems, no cross-over may exist between virtual device queues and socket queues, wherein a message that is stored in a virtual device queue of a first virtual device can be stored in the socket queue of a second hardware device that is not being represented by the first virtual device. By contrast, the computing system 300 permits such cross-over. As noted above, the message manager 370 may retrieve a message from any virtual device queues 363-365 and store the message in any of the socket queues 323-325, irrespective of which one of the virtual device queues the message is retrieved from.

Put differently, if the computing system 300 were to be a conventional computing system, any message that is stored in the virtual device queue 363 would have to be copied into the socket queue 323 only; any message that is stored in the virtual device queue 364 would have to be copied into the socket queue 324; and any message that is stored in the virtual device queue 365 would have to be copied into the socket queue 325. However, because the computing system is arranged to execute the message manager 370, at least one message that is stored in the virtual device queue 363 can be copied into two or more of the socket queues 323-325; at least one message that is stored in the virtual device queue 364 can be copied into two or more of the socket queues 323-325; and/or at least one message that is stored in the virtual device queue 365 can be copied into two or more of the socket queues 323-325.

The message manager 370 may be the same or similar to the message manager 240, which is discussed above with respect to FIG. 2. According to the present example, the message manager 370 is implemented in software. However, alternative implementations are possible in which the message manager 370 is implemented in hardware or as a combination of the hardware. Although, in the example of FIG. 3, the message manager 370 is integrated into the hypervisor 340, it will be understood that alternative implementations are possible in which the message manager 370 is executed in another component of the computing system 300. For example, in some implementations, the message manager 370 may be executed within the host operating system 320. As another example, a different instance of the message manager 370 may be executed within any of the virtual machines 341-344. Stated succinctly, the present disclosure is not limited to any specific implementation of the message manager 370.

Moreover, although in the example of FIG. 3 the message manager 370 is depicted as a separate service, it will be understood that alternative implementations are possible in which the message manager 370 is integrated into another service that is provided on the computing system 300. According to the example of FIG. 3, the message manager 370 is arranged to access the virtual device queues 363-365 directly. However, alternative implementations are possible in which the message manager 370 is arranged to access the virtual device queues 363-365 indirectly. In such implementations, the message manager 370 may interact with other services or system components to retrieve messages that are stored in any of the virtual device queues 363-365. According to the example of FIG. 3, the message manager 370 is arranged to access the socket queues 323-325 directly. However, alternative implementations are possible in which the message manager 370 is arranged to access the socket queues 323-325 indirectly. In such implementations, the message manager 370 may interact with other services or system components to store messages in any of the socket queues 323-325.

In one aspect, the message manager 370 may be arranged to enforce security policies that require certain types of messages to be transmitted only by specified communications hardware devices. In this regard, the message manager may route messages from the virtual device queues 363-365 to the socket queues 323-325 in accordance with a policy table 371. The policy table 371 may include different rules for routing messages from the virtual device queues 363-365 to the socket queues 323-325. The policy table 371 may be implemented as one or more data structures (e.g., files, etc.) that are stored in the memory 312 or at another location. Examples of different implementations of the policy table 371 are discussed further below with respect to FIGS. 4A-B.

Figure 4A:
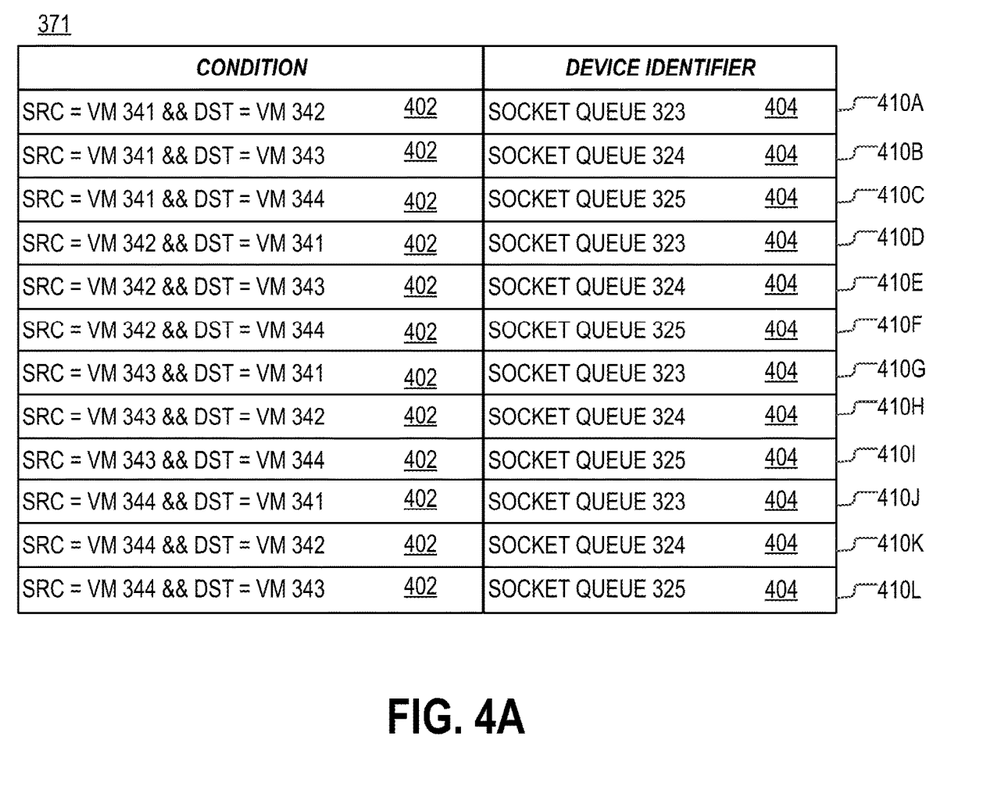
FIG. 4A is a diagram of an example of a policy table, according to aspects of the disclosure.

FIG. 4A shows an example of one possible implementation of the policy table 371, according to aspects of the disclosure. The policy table 371 may include a plurality of entries 410. Each entry 410 may include a respective condition 402 and a respective socket queue identifier 404. Together, the condition 402 and the identifier 404 (of any of the entries 410) form a rule providing that any message that satisfies the condition 402 (of the entry 410) should be stored in the socket queue identified by the identifier 404 (of the same entry 410).

According to the example of FIG. 4A, entry 410A provides that any message that is being sent by the virtual machine 341 to the virtual machine 342 should be stored in the socket queue 323. Entry 410B provides that any message that is being sent by the virtual machine 341 to the virtual machine 343 should be stored in the socket queue 324. Entry 410C provides that any message that is being sent by the virtual machine 341 to the virtual machine 344 should be stored in the socket queue 325.

Entry 410D provides that any message that is being sent by the virtual machine 342 to the virtual machine 341 should be stored in the socket queue 323. Entry 410E provides that any message that is being sent by the virtual machine 342 to the virtual machine 343 should be stored in the socket queue 324. Entry 410F provides that any message that is being sent by the virtual machine 342 to the virtual machine 344 should be stored in the socket queue 325.

Entry 410G provides that any message that is being sent by the virtual machine 343 to the virtual machine 341 should be stored in the socket queue 323. Entry 410H provides that any message that is being sent by the virtual machine 343 to the virtual machine 342 should be stored in the socket queue 324. Entry 410I provides that any message that is being sent by the virtual machine 343 to the virtual machine 344 should be stored in the socket queue 325.

Entry 410J provides that any message that is being sent by the virtual machine 344 to the virtual machine 341 should be stored in the socket queue 323. Entry 410K provides that any message that is being sent by the virtual machine 344 to the virtual machine 342 should be stored in the socket queue 324. Entry 410L provides that any message that is being sent by the virtual machine 344 to the virtual machine 343 should be stored in the socket queue 325.

Figure 4B:
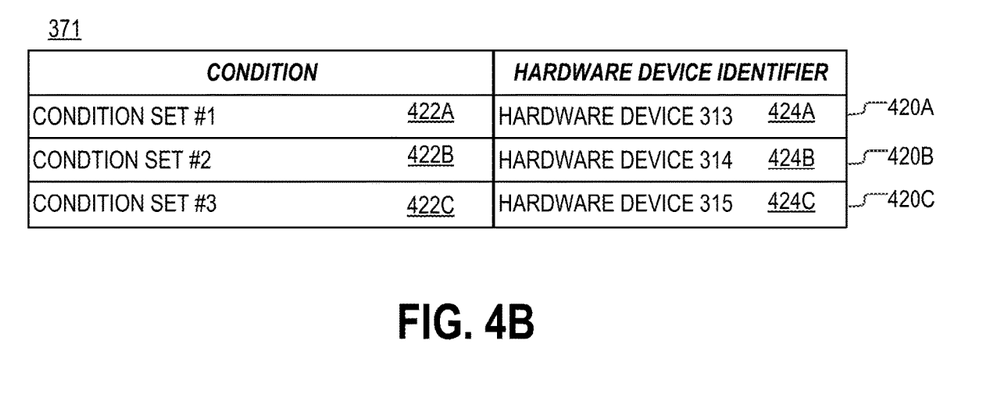
FIG. 4B is a diagram of an example of a policy table, according to aspects of the disclosure.

FIG. 4B shows an example of another possible implementation of the policy table 371, according to aspects of the disclosure. The policy table 371 may include a plurality of entries 420 (e.g., entries 420A-C). Each entry 420 may include a respective condition set 422 and a respective hardware device identifier 424.

The respective condition set may include one or more conditions. Any of the conditions may be based on the value of any of the header fields of a message and/or the payload of the message. The message may be transmitted by any of the virtual machines 341-344 to another one of the virtual machines 341-344. For example, any of the conditions may be based on a source address of the message, a destination address of the message, a destination port number of the message, a protocol type of the message, a type of the payload of the message, etc. In some implementations, any of the conditions in the respective condition set 422 may be the same or similar to the conditions 402, which are discussed above with respect to FIG. 4A. Stated succinctly, the present disclosure is not limited to any specific type of condition.

The respective hardware device identifier 424 may include a number, a string, or an alphanumerical string that identifies one of the communications hardware devices 313-325. As illustrated above with respect to FIG. 4A, the respective communications hardware device identifier 424 may identify the respective socket queue of each of the communications hardware devices 313-315. However, alternative implementations are possible in which another type of hardware device identifier is used, such as a system device ID, etc. Stated succinctly, the present disclosure is not limited to any specific type of hardware device identifier.

Together, the respective condition set 422 and the respective hardware device identifier 424 (of any of the entries 420) may form one or more rules providing that any message that satisfies any of the conditions in the respective condition set 422 (of the entry 420) should be transmitted by the communications hardware device that is identified by the respective hardware device identifier 424 (of the same entry 420). More particularly, for any given message that is stored in one of the virtual device queues 363, 364, and 365, the message manager 370 may evaluate each of the conditions in the condition set 422A, and if the any of the conditions holds true for the given message, the message manager 370 may transmit the given message via the communications hardware device that is identified by the hardware device identifier 424A. If none of the conditions in the condition set 422A holds true for the given message, the message manager 370 may evaluate each of the conditions in the condition set 422B. If any of the conditions in the condition set 422B holds true for the given message, the message manager 370 may transmit the given message via the communications hardware device that is identified by the hardware device identifier. If none of the conditions in the condition set 422B holds true, the message manager 370 may evaluate each of the conditions in the set 422C. If any of the conditions in the set 422C holds true for the given message, the message manager 370 may transmit the given message via the communications hardware device that is identified by the hardware device identifier 424C. If none of the rules in the set 422C holds true, the message manager 370 may resort to a default action, which involves transmitting the given message via the communications hardware device that corresponds to the virtual device whose virtual device queue the given message is stored in. As noted above, transmitting the message (by the message manager 370) via a particular communications hardware device may include storing the message in the respective socket queue of the particular hardware device.

Figure 5:
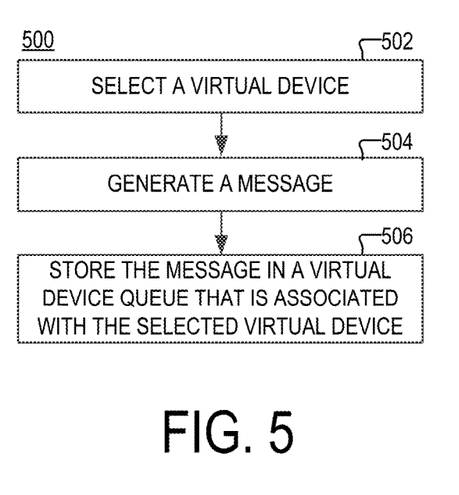
FIG. 5 is a flowchart of an example of a process, according to aspects of the disclosure.

FIG. 5 is a flowchart of an example of a process 500 for transmitting a message, according to aspects of the disclosure.

At step 502, a first virtual machine selects a virtual device. In some implementations, the first virtual machine may be the same or similar to any of the virtual machines 341-344, and the virtual device may be the same or similar to any of the virtual devices 353-355, which are discussed above with respect to FIG. 3.

At step 504, the first virtual machine (or software executed within the first virtual machine) generates a message for a second virtual machine (or software executed within the second virtual machine). In some implementations, the second virtual machine may be the same or similar to any of the virtual machines 341-344, which are discussed above with respect to FIG. 3.

At step 506, the first virtual machine (or software executed within the first virtual machine) stores the message in a virtual device queue that is associated with the selected virtual device. In some implementations, the virtual device queue may be the same or similar to any of the virtual device queues 363-365, which are discussed above with respect to FIG. 3.

According to aspects of the disclosure, placing the message in the virtual device queue associated with the selected virtual device amounts to the first virtual machine designating the message for transmission via a hardware device that is being represented by the selected virtual device. Examples of methods for processing the message after the message is stored in the virtual device queue are discussed further below with respect to FIGS. 6A-B. As is discussed further below with respect to FIGS. 6A-B, the message may be transmitted to the second virtual machine (or software executed within the second virtual machine) via a second hardware device that is different from the first device. The substitution of the first hardware device with the second hardware device may be performed transparently to the first virtual machine (or software executed within the first virtual machine).

Figure 6A:
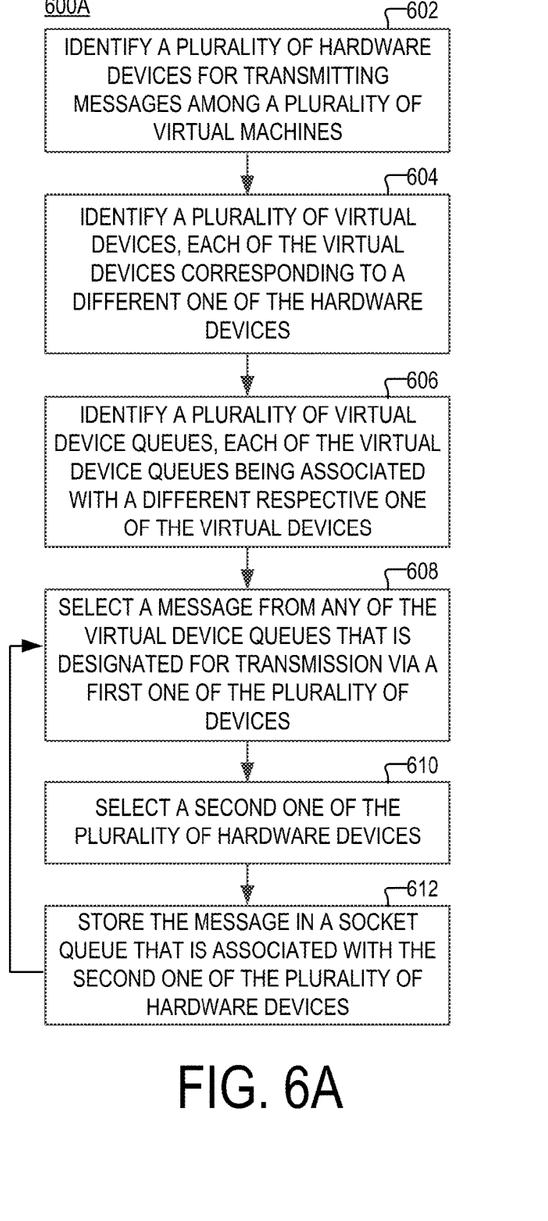
FIG. 6A is a flowchart of an example of a process, according to aspects of the disclosure.

FIG. 6A is a flowchart of an example of a process 600A for transmitting messages that are stored in one or more virtual device queues. In some implementations, the process 600A may be performed by a message manager, such as the message manager 370, which is discussed above with respect to FIG. 3. However, it will be understood that the present disclosure is not limited to any specific implementation of the process 600A.

At step 602, a plurality of communications hardware devices is identified. In some implementations, the communications hardware devices may be the same or similar to any of the communications hardware devices 313-315, which are discussed above with respect to FIG. 3.

At step 604, a plurality of virtual devices is identified, wherein each of the virtual devices represents a different one of the plurality of communications hardware devices (identified at step 602). In some implementations, the virtual devices may be the same or similar to the virtual devices 353-355, which are discussed above with respect to FIG. 3.

At step 606, a plurality of virtual device queues is identified, wherein each of the virtual device queues is associated with a different one of the plurality of virtual devices (identified at step 604). In some implementations, the virtual device queues may be the same or similar to the virtual device queues 363-365, which are discussed above with respect to FIG. 3.

At step 608, a message is retrieved from one of the plurality of virtual device queues. As discussed above with respect to FIG. 5, the message may be generated by a first virtual machine (or software executing within the first virtual machine), and it may be intended to be received by a second virtual machine. The first virtual machine and the second virtual machine may be the same or similar to any of the virtual machines 341-344, which are discussed above with respect to FIG. 3.

At step 610, a second one of the plurality of communications hardware devices is selected for transmitting the message to the second virtual machine. According to the present example, the second communications hardware device is selected in response to the message satisfying a condition associated with the second communications hardware device. In some implementations, the condition may be the same or similar to any of the conditions that are discussed above with respect to FIGS. 4A-B. In some implementations, the second hardware device may be selected in the manner discussed above with respect to FIG. 4B. Additionally, or alternatively, in some implementations, the message may be selected by using a policy table, such as the policy table 371, which is discussed above with respect to FIGS. 4A-B.

At step 612, the message is stored in a socket queue that is associated with the second communications hardware device. In some implementations, the socket queue may be the same or similar to any of the socket queues 323-325, which are discussed above with respect to FIG. 3. As discussed above with respect to FIG. 3, placing the message in the socket queue causes the message to be transmitted to the second virtual machine via the second communications hardware device.

Figure 6B:
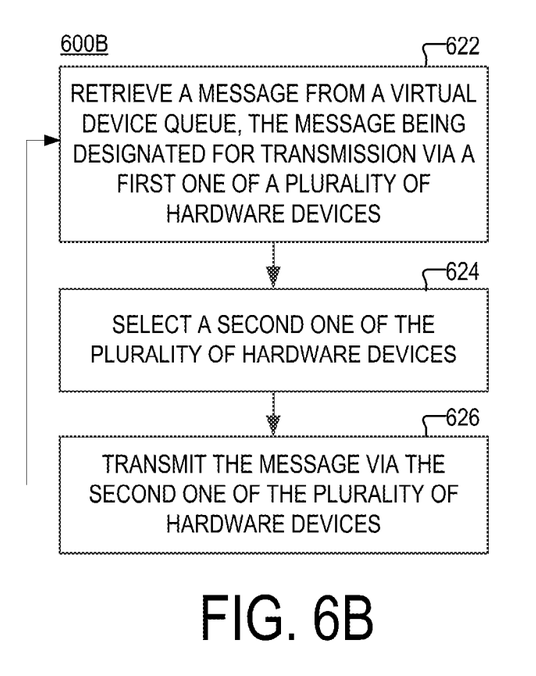
FIG. 6B is a flowchart of an example of a process, according to aspects of the disclosure.

FIG. 6B is a flowchart of an example of a process 600B for transmitting messages that are stored in one or more virtual device queues. In some implementations, the process 600B may be performed by a message manager, such as the message manager 370, which is discussed above with respect to FIG. 3. However, it will be understood that the present disclosure is not limited to any specific implementation of the process 600B.

At step 622, a message is retrieved from a first virtual device queue. The first virtual device queue is associated with a first virtual device. The first virtual device represents a first communications hardware device. As discussed above, because the message is stored in the first virtual device queue, the message is effectively designated for transmission by the first communications hardware device. The message may be generated by a first virtual machine (or software executing within the first virtual machine), and it may be directed to a second virtual machine (or software executing within the second virtual machine).

At step 624, a second communications hardware device is selected. The second communications hardware device is selected in response to the message satisfying a condition associated with the second communications hardware device. In some implementations, the condition may be the same or similar to any of the conditions that are discussed above with respect to FIGS. 4A-B. In some implementations, the second communications hardware device may be selected in the manner discussed above with respect to FIG. 4B. The second communications hardware device may be different from the first communications hardware device. The second communications hardware device may be represented by a second virtual device that is different from the first virtual device. The second virtual device may be associated with a second virtual device queue that is different from the first virtual device queue.

At step 626, the message is transmitted to the second virtual machine (or software executing within the second virtual machine) via the second communications hardware device. In some implementations, transmitting the message via the second communications hardware device may include storing the message in a socket queue that is associated with the second communications hardware device. In some implementations, the socket queue may be the same or similar to any of the socket queues 323-325, which are discussed above with respect to FIG. 3.

According to the example of FIG. 6B, the first communications hardware device may be the same or similar to any of the communications hardware devices 313-315, and the second communications hardware device may be the same or similar to another one of the communications hardware devices 313-315, which are discussed above with respect to FIG. 3. According to the example of FIG. 6B, the first virtual device may be the same or similar to any of the virtual devices 353-355, and the second virtual device may be the same or similar to another one of the virtual devices 353-355, which are discussed above with respect to FIG. 3. According to the example of FIG. 6B, the first virtual device queue may be the same or similar to any of the virtual devices queues 363-365, and the second virtual device queue may be the same or similar to another one of the virtual devices queues 363-365, which are discussed above with respect to FIG. 3. According to the example of FIG. 6B, the first virtual machine may be the same or similar to any of the virtual machines 341-344, which are discussed above with respect to FIG. 3. According to the example of FIG. 6B, the second virtual machine may be the same or similar to any of the virtual machines 341-344, which are discussed above with respect to FIG. 3. Although in the example of FIG. 6B the first communications hardware device and the second communications hardware device are different, it will be understood that under some circumstances they can be the same (e.g., when the condition satisfied by the message is associated with the first virtual device).

By way of example, in some implementations, the messages that are discussed with respect to FIGS. 2-6 may include Advanced Message Queueing Protocol (AMQP) messages. The first communication channel, the second communication channel, and the third communication channel, which are discussed above with respect to FIGS. 2-6 may be implemented using lower-level communications protocols, such as Ethernet, Universal Serial Bus, PCI, etc. When the AMQP messages are received at a virtual machine, they may be reconstituted and provided to software that is arranged to process the AMQP messages, without the software being aware of which communications channel (and/or communications hardware device) has been used to transmit the AMQP messages. In other words, the operations for transmitting messages that are performed by the message manager 370 and/or the processes 600A-B may be executed transparently of the virtual machines (or software executing within the virtual machines) that transmit or receive the messages.

Figure 7:
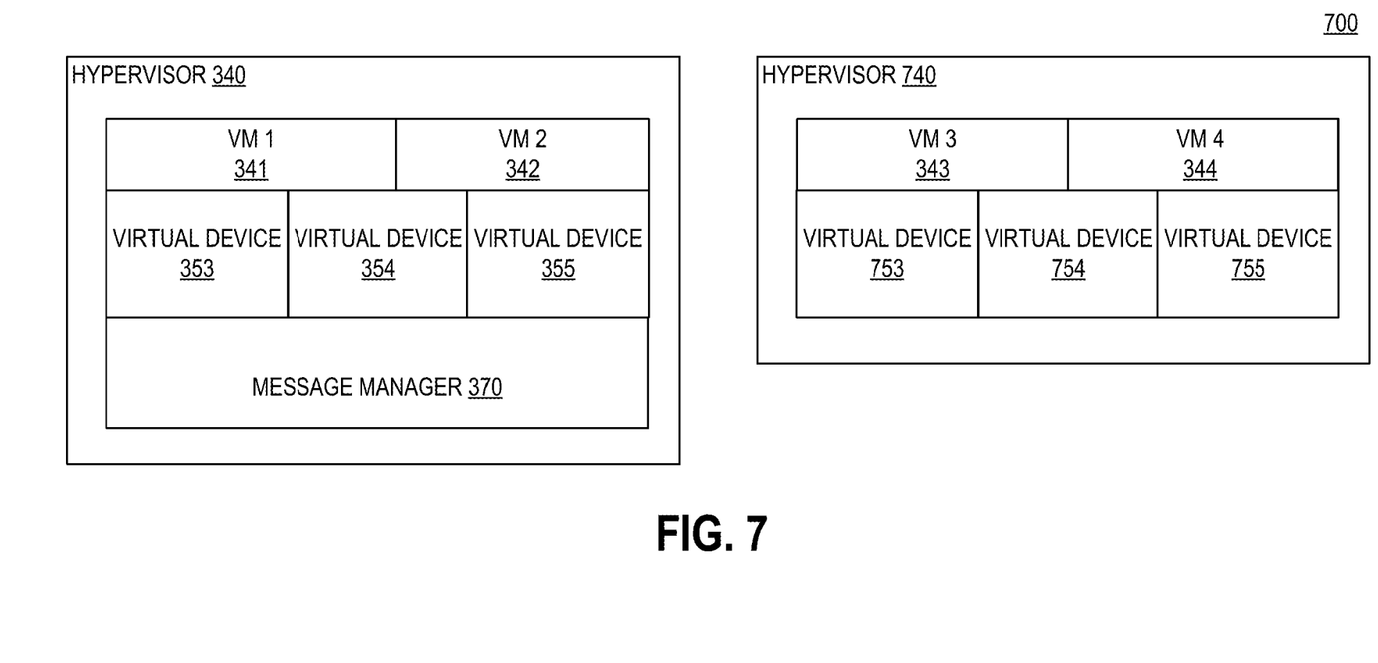
FIG. 7 is a diagram of an example of a system, according to aspects of the disclosure.

FIG. 7 is a diagram of a system 700, according to aspects of the disclosure. As illustrated, the system 700 includes the hypervisor 340 (see FIG. 3) and a hypervisor 740. According to the example of FIG. 7, the hypervisor 340 is arranged to execute the virtual machines 341 and 342, whereas the hypervisor 740 is arranged to execute the virtual machines 343 and 344. As illustrated, the hypervisor 740 may be arranged to provide the virtual machines 343 and 344 with a virtual device 753, a virtual device 754, and a virtual device 755. Each of the virtual devices 753-755 may be associated with respective communications hardware device for transmitting data over a respective communications channel. For example, the virtual device 753 may be associated with a communications hardware device for transmitting data over a first communications channel (e.g., a PCI bus), such as the communications hardware device 313. The virtual device 754 may be associated with a communications hardware device for transmitting data over a second communications channel (e.g., a serial data link), such as the communications hardware device 314. And the virtual device 755 may be associated with a communications hardware device for transmitting data over a third communications channel (e.g., an Ethernet link), such as the communications hardware device 315.

FIG. 7 is provided to illustrate that the techniques discussed with respect to FIGS. 2-6B can be applied in situations in which messages are exchanged between virtual machines that are executed in different hypervisors. According to the example of FIG. 7, the message manager may be arranged to transmit messages to a virtual machine (or software executed within the second virtual machine) that is executed in a different hypervisor than the message manager 370. According to the example of FIG. 7, the hypervisor 340 and the hypervisor 740 are executed on the same computing device (e.g., server). However, alternative implementations are possible in which the hypervisors 340 and the hypervisor 740 are executed on different computing devices. In this regard, it will be understood that the techniques discussed with respect to FIGS. 2-6B can be applied in situations in which messages are exchanged between virtual machines that are executed on different computing devices.

Figure 8:
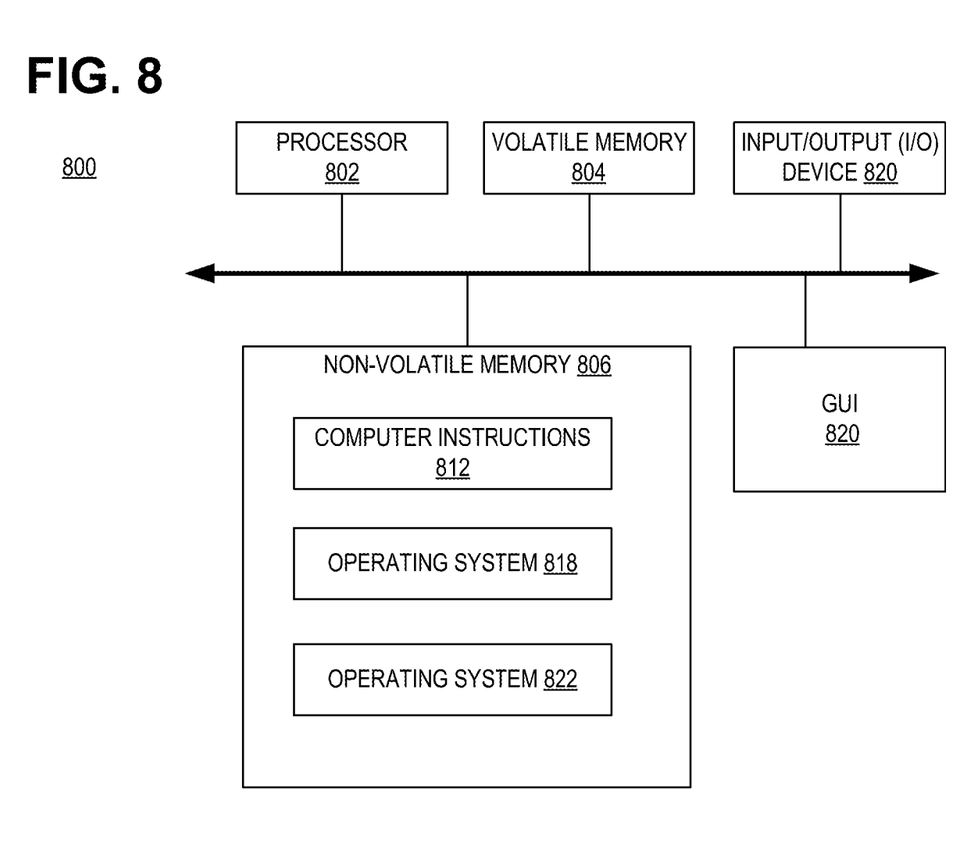
FIG. 8 is a diagram of an example of an electronic device, according to aspects of the disclosure.

Referring to FIG. 8, computing device 800 that can be used to implement, at least in part, the computing system 300. As illustrated, the computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 818 and data 822 such that, for example, the computer instructions 812 are executed by the processor 802 out of volatile memory 804. Program code may be applied to data entered using an input device of GUI 808 or received from I/O device 820.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

The processes described herein are not limited to use with hardware and software of FIG. 1; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A method comprising:

retrieving a message that is designated for transmission via a first one of a plurality of communications hardware devices, the message being retrieved from a virtual device queue associated with an abstraction of the first communications hardware device, the abstraction of the first communication s hardware device and the virtual device queue being provided by a hypervisor executing a first virtual machine, the message being generated by the first virtual machine, and the message being designated for transmission to a second virtual machine;

selecting a second one of the plurality of communications hardware devices based on a policy rule, the policy rule including a condition identifying: (i) the first virtual machine as a source virtual machine for messages against which the policy rule is applied, (ii) the second virtual machine as a destination virtual machine for the messages against which the policy rule is applied, and (iii) a respective identifier of the second communications hardware device, thereby designating the second communications hardware device as a preferred device for handling messages that are transmitted from the first virtual machine to the second virtual machine, the policy rule being enforced against messages that are transmitted from the first virtual machine to the second virtual machine; and storing the message in a socket queue that is associated with the second communications hardware device, the socket queue being provided outside of the hypervisor in an operating system that is executing the hypervisor, wherein storing the message in the socket queue that is associated with the second communications hardware device causes the message to be transmitted to the second virtual machine via the second communications hardware device rather than the first communications hardware device, the first and second communications hardware devices being part of a computing system that is executing the first virtual machine, wherein the first communications hardware device is configured to transmit and receive data over a first communications channel that is not monitored by a monitoring utility, the second communications hardware device is configured to transmit and receive data over a second communications channel that is monitored by the monitoring utility, and storing the message in the socket queue that is associated with the second communications hardware device causes the message to be examined by the monitoring utility.

2. The method of claim 1, wherein the second virtual machine is executed by the hypervisor.

3. The method of claim 1, wherein the first virtual machine and the second virtual machine are at least one of: (i) executed by using different hypervisors or (ii) executed on different computing systems.

4. The method of claim 1, wherein the identifier of the second communications hardware device includes an identifier of the socket queue that is associated with the second communications hardware device.

5. The method of claim 1, wherein the first communications hardware device includes a Peripheral Component Interconnect (PCI) bus controller, and the second communications hardware device includes an Ethernet controller.

6. The method of claim 1, wherein the first virtual machine and the second virtual machine are both executed by the hypervisor, and the virtual device queue is part of the abstraction of the first communications hardware device.

7. A system comprising:
a plurality of communications hardware devices;
a memory; and
at least one processor operatively coupled to the memory, the at least one processor being configured to perform the operations of:
retrieving a message that is designated for transmission via a first one of the plurality of communications hardware devices, the message being retrieved from a virtual device queue associated with an abstraction of the first communications hardware device, the abstraction of the first communications hardware device and the virtual device queue being provided by a hypervisor executing a first virtual machine, the message being generated by the first virtual machine, and the message being designated for transmission to a second virtual machine, the first virtual machine being executed by the at least one processor;
selecting a second one of the plurality of communications hardware devices based on a policy rule, the policy rule including a condition identifying: (i) the first virtual machine as a source virtual machine for messages against which the policy rule is applied, (ii) the second virtual machine as a destination virtual machine for the messages against which the policy rule is applied, and (iii) a respective identifier of the second communications hardware device, thereby designating the second communications hardware device as a preferred device for handling messages that are transmitted from the first virtual machine to the second virtual machine, the policy rule being enforced against messages that are transmitted from the first virtual machine to the second virtual machine; and
storing the message in a socket queue that is associated with the second communications hardware device, the socket queue being provided outside of the hypervisor in an operating system that is executing the hypervisor,
wherein storing the message in the socket queue that is associated with the second communications hardware device causes the message to be transmitted to the second virtual machine via the second communications hardware device rather than the first communications hardware device,
wherein the first communications hardware device is configured to transmit and receive data over a first communications channel that is not monitored by a monitoring utility, the second communications hardware device is configured to transmit and receive data over a second communications channel that is monitored by the monitoring utility, and storing the message in the socket queue that is associated with the second communications hardware device causes the message to be examined by the monitoring utility.

8. The system of claim 7, wherein second virtual machine is executed by the hypervisor.

9. The system of claim 7, wherein the first virtual machine and the second virtual machine are at least one of: (i) executed by using different hypervisors or (ii) executed on different computing devices.

10. The system of claim 7, wherein the identifier of the second communications hardware device includes an identifier of the socket queue that is associated with the second communications hardware device.

11. The system of claim 7, wherein the first communications hardware device includes a Peripheral Component Interconnect (PCI) bus controller, and the second communications hardware device includes an Ethernet controller.

12. The system of claim 7, wherein the first virtual machine and the second virtual machine are both executed by the hypervisor, and the virtual device queue is part of the abstraction of the first communications hardware device.

13. A non-transitory computer-readable medium storing one or more processor-executable instructions, which when executed by at least one processor to perform the operations of:
retrieving a message that is designated for transmission via a first one of a plurality of communications hardware devices, the message being retrieved from a virtual device queue associated with an abstraction of the first communications hardware device, the abstraction of the first communications hardware device and the virtual device queue being provided by a hypervisor executing a first virtual machine, the message being generated by the first virtual machine, and the message being designated for transmission to a second virtual machine;
selecting a second one of the plurality of communications hardware devices based on a policy rule, the policy rule including a condition identifying: (i) the first virtual machine as a source virtual machine for messages against which the policy rule is applied, (ii) the second virtual machine as a destination virtual machine for the messages against which the policy rule is applied, and (iii) a respective identifier of the second communications hardware device, thereby designating the second communications hardware device as a preferred device for handling messages that are transmitted from the first virtual machine to the second virtual machine, the policy rule being enforced against messages that are transmitted from the first virtual machine to the second virtual machine; and
storing the message in a socket queue that is associated with the second communications hardware device, the socket queue being provided outside of the hypervisor in an operating system that is executing the hypervisor,
wherein storing the message in the socket queue that is associated with the second communications hardware device causes the message to be transmitted to the second virtual machine via the second communications hardware device rather than the first communications hardware device, the first communications hardware device, the second communications hardware device, and the processor being part of a computing system that is executing the first virtual machine, wherein the first communications hardware device is configured to transmit and receive data over a first communications channel that is not monitored by a monitoring utility, the second communications hardware device is configured to transmit and receive data over a second communications channel that is monitored by the monitoring utility, and storing the message in the socket queue that is associated with the second communications hardware device causes the message to be examined by the monitoring utility.

14. The non-transitory computer-readable medium of claim 13, wherein second virtual machine is executed by the hypervisor.

15. The non-transitory computer-readable medium of claim 13, wherein the first virtual machine and the second virtual machine are at least one of: (i) executed by using different hypervisors or (ii) executed on different computing devices.

16. The non-transitory computer-readable medium of claim 13, wherein the identifier of the second hardware device includes an identifier of the socket queue that is associated with the second communications hardware device.

17. The non-transitory computer-readable medium of claim 13, wherein the first communications hardware device includes a Peripheral Component Interconnect (PCI) bus controller, and the second communications hardware device includes an Ethernet controller.

* * * * *